United States Patent
Okamura

(10) Patent No.: US 10,534,249 B2
(45) Date of Patent: Jan. 14, 2020

(54) CONTROL APPARATUS, PROJECTION DISPLAY APPARATUS AND NON-TRANSITORY COMPUTER-READABLE STORAGE MEDIUM

(71) Applicant: CANON KABUSHIKI KAISHA, Tokyo (JP)

(72) Inventor: Takahiro Okamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/117,655

(22) Filed: Aug. 30, 2018

(65) Prior Publication Data

US 2019/0072841 A1    Mar. 7, 2019

(30) Foreign Application Priority Data

Sep. 4, 2017  (JP) .................................. 2017-169115

(51) Int. Cl.
  *G03B 21/20* (2006.01)
  *H04N 5/57* (2006.01)
  *H04N 5/74* (2006.01)

(52) U.S. Cl.
  CPC ..... *G03B 21/2053* (2013.01); *G03B 21/2046* (2013.01); *H04N 5/57* (2013.01); *H04N 5/7441* (2013.01)

(58) Field of Classification Search
  CPC .. G03B 21/206; G03B 21/208; G03B 21/204; G03B 21/2053; H04N 9/3152; H04N 9/3155; H04N 9/3164
  See application file for complete search history.

(56) References Cited

U.S. PATENT DOCUMENTS

| 7,530,695 | B2 | 5/2009 | Furihata |
| 9,412,310 | B2 | 8/2016 | Nobori et al. |
| 9,588,410 | B2 | 3/2017 | Horiguchi et al. |
| 2009/0284544 | A1* | 11/2009 | Nobori ................. G09G 3/3406 345/589 |
| 2013/0044297 | A1* | 2/2013 | Horiguchi ............ H04N 9/3155 353/85 |

(Continued)

FOREIGN PATENT DOCUMENTS

| JP | 2006064825 A | 3/2006 |
| JP | 2006106691 A | 4/2006 |

(Continued)

OTHER PUBLICATIONS

Copending U.S. Appl. No. 16/117,955, filed Aug. 30, 2018.
Office Action issued in U.S. Appl. No. 16/117,955 dated May 22, 2019.

*Primary Examiner* — Sultan Chowdhury
(74) *Attorney, Agent, or Firm* — Rossi, Kimms & McDowell LLP

(57) ABSTRACT

A control apparatus includes a calculator that calculates a target dimming rate of a projection display apparatus based on a feature quantity of image data, a diaphragm controller that controls a diaphragm position of a diaphragm based on a target diaphragm position corresponding to the target dimming rate, and a light source controller that controls a light quantity of a light source based on the target dimming rate and a dimming rate of the diaphragm at least until the diaphragm position of the diaphragm matches the target diaphragm position.

9 Claims, 9 Drawing Sheets

(56) References Cited

U.S. PATENT DOCUMENTS

2013/0201409 A1* 8/2013 Yuzawa ............... F21V 11/183
                                                    348/744
2014/0368746 A1* 12/2014 Sugiyama ........... H04N 5/7416
                                                    348/759

FOREIGN PATENT DOCUMENTS

| JP | 4238765 B2   | 3/2009  |
|----|--------------|---------|
| JP | 2012103642 A | 5/2012  |
| JP | 2013057930 A | 3/2013  |
| JP | 2014187460 A | 10/2014 |

* cited by examiner

CONTROL APPARATUS, PROJECTION DISPLAY APPARATUS AND NON-TRANSITORY COMPUTER-READABLE STORAGE MEDIUM

BACKGROUND OF THE INVENTION

Field of the Invention

The present invention relates to a control apparatus, a projection display apparatus and a non-transitory computer-readable storage medium.

Description of the Related Art

Conventionally, to improve a contrast of an image projected by a projection display apparatus, a control method of an emission light quantity of a light source and a control method of a light quantity outputted using a diaphragm has been proposed. Japanese Patent Laid-Open No. ("JP") 2014-187460 discloses a method to perform image expansion processing in accordance with a position of a shutter in performing the image expansion processing according to dimming because a movement of the shutter takes a finite time.

However, in JP 2014-187460, when a moving speed of the shutter is slow, the contrast while the shutter moves is worse than the contrast when a position of the shutter is a target position.

SUMMARY OF THE INVENTION

The present invention provides a control apparatus, a projection display apparatus and a non-transitory computer-readable storage medium capable of improving a contrast while a shutter moves.

A control apparatus according to the present invention includes a calculator that calculates a target dimming rate of a projection display apparatus based on a feature quantity of image data, a diaphragm controller that controls a diaphragm position of a diaphragm based on a target diaphragm position corresponding to the target dimming rate, and a light source controller that controls a light quantity of a light source based on the target dimming rate and a dimming rate of the diaphragm at least until the diaphragm position of the diaphragm matches the target diaphragm position.

Further features of the present invention will be described from the following description of the example description with reference to the attached drawings.

DESCRIPTION OF THE PREFERRED EMBODIMENTS

Figure 1:
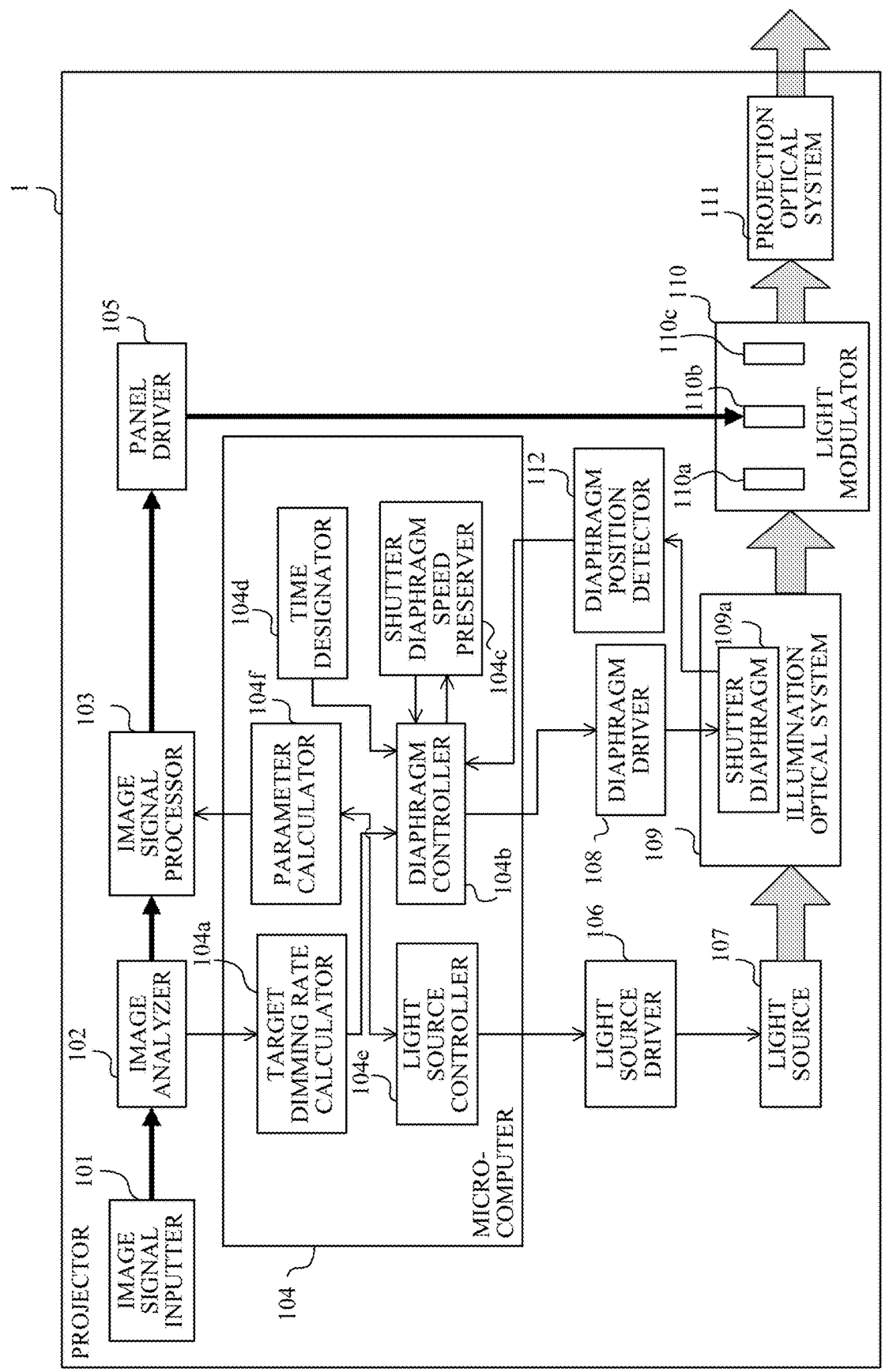
FIG. 1 is a block diagram of a projection display apparatus according to a first embodiment.

A description will be given of embodiments of the present invention with reference to the accompanying drawings. Corresponding elements in each figure will be designated by the same reference numerals, and a description thereof will be omitted.

First Embodiment

First, referring to FIG. 1, a description will be given of a projection display apparatus according to this embodiment. FIG. 1 is a block diagram of a projector 1 which is the projection display apparatus according to this embodiment.

An image signal inputter 101 includes an interface connector for image signal input and receives an image signal (image data) from an outside of the projector 1. Having a signal form corresponding to each transmission format when passing through a cable, the image signal is converted into a signal format, which can be easily processed in subsequent image processing, by the image signal inputter 101. The converted image signal is transmitted to an image analyzer 102.

The image analyzer 102 receives the image signal transmitted from the image signal inputter 101 and analyzes the image. The image analyzer 102 obtains the brightest brightness value, the darkest brightness value, a brightness average value of all pixels, and the like from the image for each frame. Further, the image analyzer 102 may obtain the above-mentioned information from a histogram of a brightness gradation value and each block in a state of dividing a screen into a plurality of blocks. The image analyzer 102 transmits the image signal received from the image signal inputter 101 as it is to the image signal processor 103 and transmits obtained analysis information to the control unit (controller) 104.

The image signal processor 103 performs image elongation and color processing on the image signal received from the image analyzer 102 using a gain adjustment rate (gain) received from the control unit 104 and a parameter for color change processing. By performing gain processing on the image in accordance with light extinction of a light quantity performed by a light source 107 and a shutter diaphragm 109a, bright part can maintain brightness. Further, the color processing is performed for each color of RGB or YCbCr by performing calculation using parameters for the color processing and 3DLUT. Color changes may occur (for example, an output spectrum of a phosphor is changed) in accordance with the light extinction of the light quantity performed by the light source 107 and the shutter diaphragm 109a. The color processing to suppress the color changes while dimming can suppress the color changes of a projection image due to dimming. The image signal processed by the image signal processor 103 is transmitted to a panel driver 105. In this embodiment, the shutter diaphragm is used as a light shielding unit, but a glow-stop or the like may be used.

The control unit 104 includes a microcomputer (processor) and controls each unit in the projector 1 according to a control program as a computer program.

A target dimming rate calculator (calculator) 104a calculates a target dimming rate, which is a target value of a light quantity adjustment in the entire projector 1, based on analysis information (feature quantity) obtained from the image analyzer 102. In this embodiment, the target dimming rate calculator 104a calculates the target dimming rate as a ratio to an output light quantity when the diaphragm is an open state and a light quantity of the light source is 100 percent. In this embodiment, the target dimming rate is calculated using the above method, but the present invention is not limited to this.

A diaphragm controller 104b obtains a target diaphragm position, which is a diaphragm position corresponding to the target dimming rate, from the target dimming rate calculated by the target dimming calculator 104a and obtains a current diaphragm position of the shutter diaphragm 109a detected by a diaphragm position detector 112. The diaphragm controller 104b calculates a scheduled driving diaphragm quantity of the shutter diaphragm 109a by taking a difference between the target diaphragm position and the current diaphragm position. The diaphragm controller 104b obtains a diaphragm dimming rate corresponding to the scheduled driving diaphragm quantity and transmits the obtained diaphragm dimming rate to a light source controller 104e. In this embodiment, the diaphragm controller 104b uses a correspondence table between the dimming rate and the diaphragm position stored in advance in a storage unit (not illustrated) to calculate the diaphragm position of the shutter diaphragm 109a corresponding to the dimming rate, or the dimming rate corresponding to the diaphragm position of the shutter diaphragm 109a. The storage unit may hold a conversion expression of the dimming rate and the diaphragm position instead of the correspondence table. Further, the diaphragm controller 104b obtains a drivable speed of the shutter diaphragm 109a from a shutter diaphragm speed preserver 104c and usable time of a movement of the shutter diaphragm 109a from a time designator 104d to determine whether an operating speed of the shutter diaphragm 109a reaches the target value. Since dimming can be performed according to an image change, the diaphragm position of the shutter diaphragm 109a is preferably changed in synchronism with a vertical synchronizing signal of the image.

The shutter diaphragm speed preserver 104c stores a relationship between a diaphragm moving quantity and time of the shutter diaphragm 109a as a relational expression or a correspondence table and transmits to the diaphragm controller 104b as needed.

The time designator 104d sets a shutter set interval time and a light source set interval time and the like. The light source set interval time is usually set to be shorter than the shutter set interval time. For example, if an input image is set by time of one frame, feedback to a shutter operation is performed every time the input image is updated. The time may be set by a user or may be switched depending on an operation mode when a recommended value is initialized.

A light source controller 104e calculates a light source dimming rate (target light source dimming rate) to reach the target dimming rate based on the target dimming rate calculated by the target dimming rate calculator 104a and the diaphragm dimming rate obtained by the diaphragm controller 104b. The light source dimming rate is a ratio of a target output light quantity to the maximum output light quantity of the light source 107. In this embodiment, the light source controller 104e calculates the light source dimming rate by subtracting the diaphragm dimming rate from the dimming rate diaphragm. The light source controller 104e calculates a light quantity set value of the light source 107 corresponding to the calculated light source dimming rate.

In this embodiment, the light source controller 104e obtains a light quantity set value of the light source 107 corresponding to the light source dimming rate calculated using the correspondence table of the light source dimming rate and the light quantity set value previously stored in the storage unit (not illustrated). The storage unit may hold a conversion expression between the light source dimming rate and the light quantity set value instead of the correspondence table. The light source controller 104e drives the light source driver 106 so that the light quantity of the light source 107 becomes the calculated light quantity set value. That is, the light source controller 104e controls the light quantity of the light source 107. The light source controller 104e may use the calculated value as the light quantity set value as when the light quantity set value can be set steplessly, but may use the closest or rounded value from the calculated value as the light quantity set value when the light quantity set value can be set stepwisely. Further, since dimming can be performed according to an image change, the light quantity of the light source 107 is preferably changed in synchronism with a vertical synchronizing signal of the image.

A parameter calculator 104f calculates a gain adjustment rate to expand the image and a parameter to perform color processing from the target dimming rate calculated by the target dimming rate calculator 104a. That is, in this embodiment, the parameter calculator 104f functions as a gain calculator and a color processing parameter calculator. The diaphragm dimming rate calculated by the diaphragm controller 104b and the light source dimming rate calculated by the light source controller 104e may be used instead of the target dimming rate calculated by the dimming rate calculator 104a.

The light source driver 106 is an electrical circuit for driving the light source 107 under a control of the diaphragm controller 104c to change the light quantity of the light source 107. The light source driver 106 has a configuration according to a method of the light source 107. For example, when the light source 107 is a discharge lamp, the light source driver 106 has a ballast substrate that generates a high voltage for discharge. In addition, when the light source 107 is a solid light source such as a laser, the light source driver 106 has a driving circuit mounted with a constant current driver. Since physical drive (mechanical drive such as a diaphragm) is not needed, a light quantity change rate of the light source 107 is fast, and the light quantity of the light source 107 can be changed in µs order.

The light source 107 is configured from a discharge lamp or a solid light source such as a laser and an LED. In this embodiment, the solid light source, which is easy to perform a light quantity control quickly and precisely is used as the light source 107, but the discharge lamp may be used if a light quantity control can be performable. When using the solid light source, to complement a missing color in the light source, light irradiated to some phosphors is also used together.

The light emitted from the light source 107 is adjusted by an optical element such as a mirror and a lens provided in an illumination optical system 109. A diaphragm driver 108 is configured from an electric circuit including a driver IC and the like, and a diaphragm driving motor, and changes the diaphragm position of the shutter diaphragm 109a under the control of the diaphragm controller 104b. The shutter diaphragm 109a is configured from a light shielding plate, a motor, a gear and the like. Since the shutter diaphragm 109a is driven physically (mechanically), a light quantity change speed is slower than that by the light source 107. The driving time of the shutter diaphragm 109a often expressed in ms order, although it depends on the driving configuration and the type of the motor. The light adjusted by the illumination optical system 109 is incident on the light modulator 110.

The diaphragm position detector (detector) 112 is configured from a linear encoder and the like, and detects the diaphragm position of the shutter diaphragm 109a. The detection result by the diaphragm position detector 112 is transmitted to the diaphragm controller 104b.

The light modulator 110 includes a color separation optical system 110a, a liquid crystal panel 110b, and a color combining optical system 110c. The color separation optical system 110a decomposes the light (white light) from the illumination optical system 109 into three color lights of R, G and B color (R light, G light and B light). The liquid crystal panel 110b is configured from three light modulation elements, and optically modulates each of the three color lights. The color combining optical system 110c combines the three color lights light-modulated by the liquid crystal panel 110b. In such a configuration, the light modulator 110 drives the liquid crystal panel 110b on the basis of the driving signal received from the panel driver 105, and modulates incident light (performs light modulation). The liquid crystal panel 110b may be a transmissive type or a reflective type. In this embodiment, the liquid crystal panel 110b is used as the light modulation element, but a digital micromirror device (DMD) may be used. In this case, the R light, the G light and the B light sequentially extracted from the white light from the illumination optical system 109 by the color filter sequentially enter one DMD and are optically modulated.

The light (that is, the image) modulated by the light modulator 110 is projected onto a projection surface (not illustrated) such as a screen through a projection optical system (projection unit, projection lens) 111 having an optical system such as a lens and a mirror. The projection optical system 111 may be integrally fixed to the projector 1 or may be exchangeably attached to the projector 1.

Figure 2:
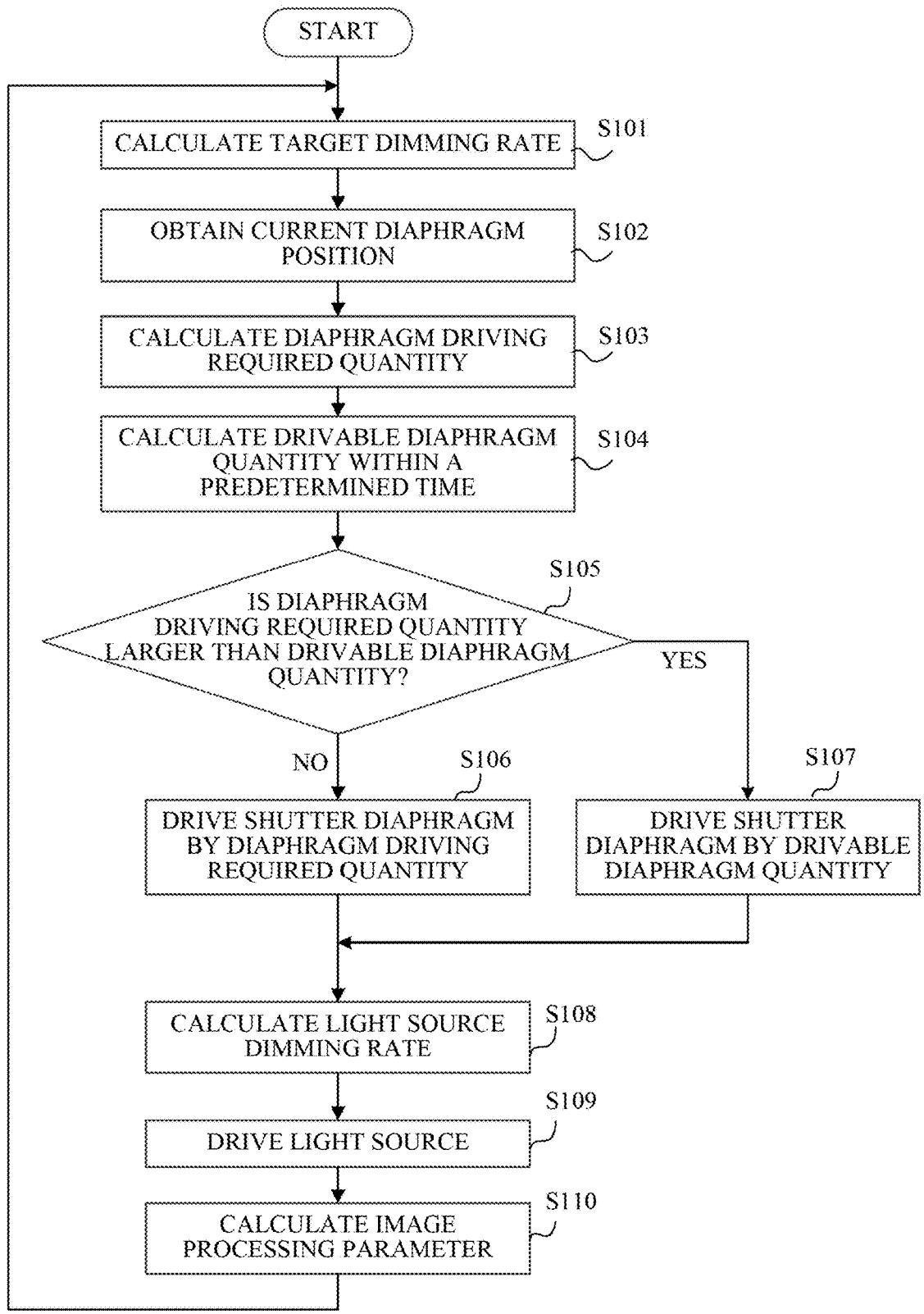
FIG. 2 is a flowchart of a control method to change a dimming rate according to the first embodiment.

Referring now to FIG. 2, a description will be given of a control method to change the dimming rate by the control unit 104 according to this embodiment (a method to change the dimming rate of the shutter diaphragm 109a and the light source 107 according to the image). FIG. 2 is a flowchart of the control method to change the dimming rate.

In the step S101, the target dimming rate calculator 104a calculates the target dimming rate, which is the target value of the light quantity adjustment in the entire projector 1, based on the analysis result obtained from the image analyzer 102.

In the step S102, the diaphragm controller 104b obtains the current diaphragm position of the shutter diaphragm 109a from the diaphragm position detector 112.

In the step S103, the diaphragm controller 104b first converts the target dimming rate calculated in the step S101 the target diaphragm position, which is the diaphragm position corresponding to the target dimming rate. Subsequently, the diaphragm controller 104b calculates the driving quantity (diaphragm driving required quantity) required to achieve the target dimming rate by the diaphragm dimming rate of the shutter diaphragm 109a by taking the difference between the target diaphragm position and the current diaphragm position obtained in the step S102.

In the step S104, the diaphragm controller 104b first obtains the speed (driving speed) capable of driving the shutter diaphragm 109a from the shutter diaphragm speed preserver 104c and the shutter set interval from the time designator 104d. Subsequently, the diaphragm controller 104b calculates the diaphragm quantity (drivable diaphragm quantity) by which the shutter diaphragm 109a is drivable within a predetermined time using the obtained information.

In the step S105, the diaphragm controller 104b determines whether the diaphragm driving required quantity calculated in the step S103 is larger than the drivable diaphragm quantity calculated in the step S104. When the diaphragm driving required quantity is larger than the drivable diaphragm quantity, the flow moves to the step S106, and when the diaphragm driving required quantity is smaller than the drivable diaphragm quantity, the flow moves to the step S107.

In the step S106, the diaphragm controller 104b transmits the driving command to the diaphragm driver 108 to drive the shutter diaphragm 109a by the diaphragm driving required quantity calculated in the step S103 by the diaphragm driver 108.

In the step S107, the diaphragm controller 104b transmits the driving command to the diaphragm driver 108 to drive the shutter diaphragm 109a by the drivable diaphragm quantity calculated in the step S104 by the diaphragm driver 108.

In the step S108, the light source controller 104e calculates the light source dimming rate based on the target dimming rate and the diaphragm dimming rate calculated from the diaphragm quantity set to drive the shutter diaphragm 109a by the diaphragm controller 104b. Specifically, the light source controller 104e calculates the difference between the target dimming rate and the diaphragm dimming rate as the light source dimming rate. When the difference between the target dimming rate and the diaphragm dimming rate is not zero, that is, the diaphragm dimming rate reaches the target dimming rate, controlling the light source dimming rate is unnecessary.

In the step S109, the light source controller 104e drives the light source 107 through the light source driver 106 on the basis of the light quantity setting value corresponding to the light source dimming rate calculated in the step S108.

In the step S110, the parameter calculator 104f calculates the setting parameter used for the image processing by the image signal processor 103 from the target dimming rate calculated in the step S101. The calculated setting parameter used of the image processing is transmitted to the image signal processor 103. After this processing is completed and the shutter set interval time set by the time designator 104d has passed, the flow moves to the step S101 to loop the processing.

As described above, according to this embodiment, the difference between the target dimming rate and the diaphragm dimming rate caused by a delay of the driving of the shutter diaphragm 109a while driving the shutter diaphragm 109a is corrected by driving the light source 107 to control the light source dimming rate. Therefore, even when the shutter is being driven, the contrast effect can be improved.

Second Embodiment

A configuration of a projector which is a projection display apparatus according to this embodiment is the same as that of the projector 1 according to the first embodiment and thus a detailed description thereof will be omitted.

Figure 3:
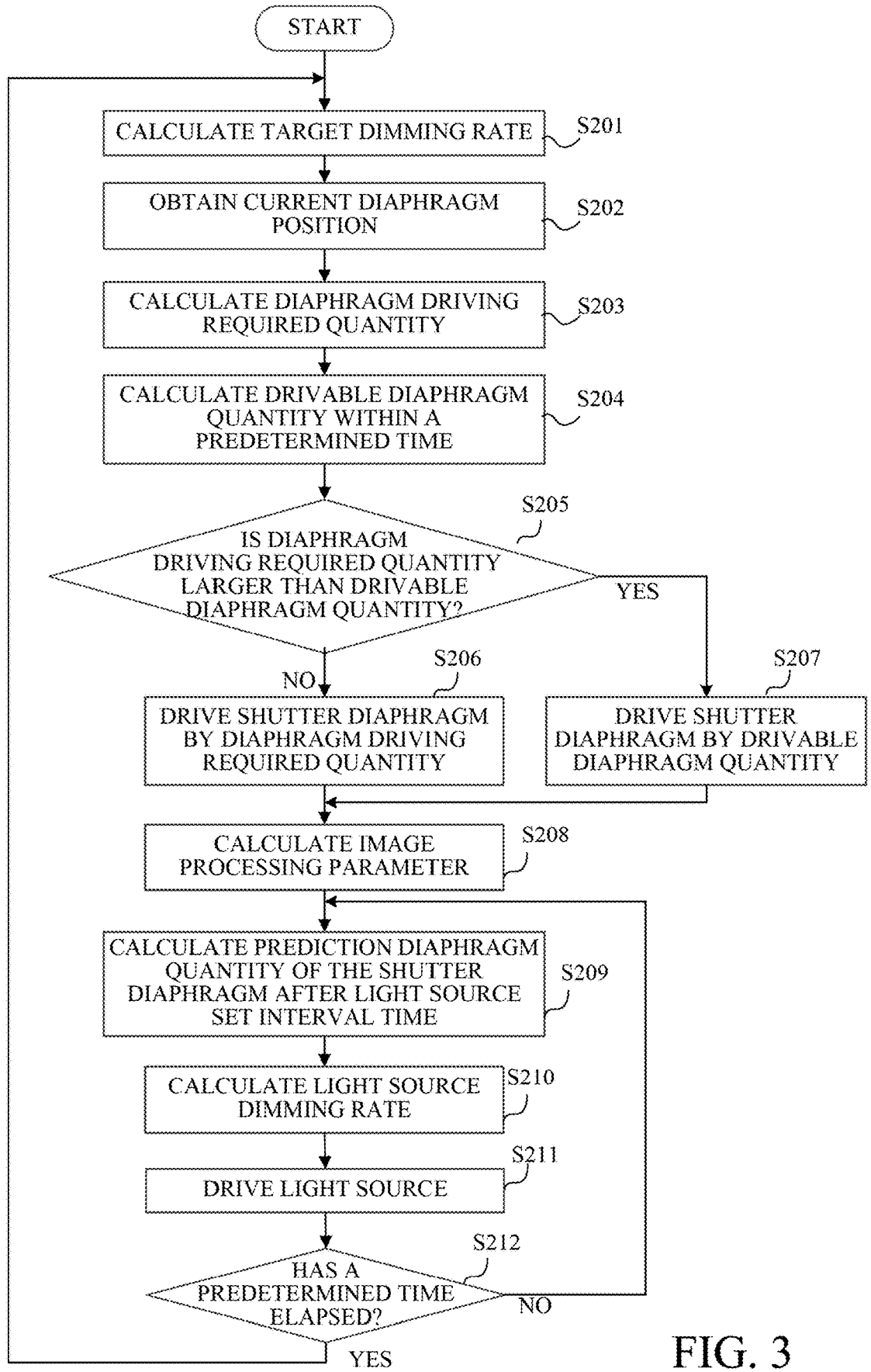
FIG. 3 is a flowchart of a control method to change a dimming rate according to a second embodiment.

Referring now to FIG. 3, a description will be given of a control method to change the dimming rate by the control unit 104 according to this embodiment. FIG. 3 is a flowchart of the control method to change the dimming rate.

Processes from the step S201 to the step S207 are respectively the same as the processes from the step S101 to the step S107 in FIG. 2 and thus a detailed description thereof will be omitted.

In the step S208, the parameter calculator 104f calculates the setting parameter used for the image processing by the image signal processor 103 from the target dimming rate calculated in the step S201. The calculated parameter is transmitted to the image signal processor 103.

In the step S209, the diaphragm controller 104b first obtains the light source set interval time from the time designator 104d. Subsequently, the diaphragm controller 104b calculates a prediction diaphragm quantity of the shutter diaphragm 109a after the light source set interval time based on the light source set interval time, the diaphragm quantity set when driving the shutter diaphragm 109a, and the drivable speed of the shutter diaphragm 109a obtained in the step S204.

In the step S210, the light source controller 104c calculates the light source dimming rate based on the target dimming rate and the diaphragm dimming rate calculated from the prediction diaphragm quantity by the diaphragm controller 104b.

In the S211, the source controller 104e drives the light source 107 through the light source driver 106 on the basis of the light quantity setting value corresponding to the light source dimming rate calculated in the step S210.

In the step S212, the control unit 104 determines whether the shutter set interval time set in the step S204 has elapsed. When the shutter set interval time has elapsed, the flow moves to the step S201, and when the shutter set interval time has not elapsed, the flow moves to step S209.

Figure 4:
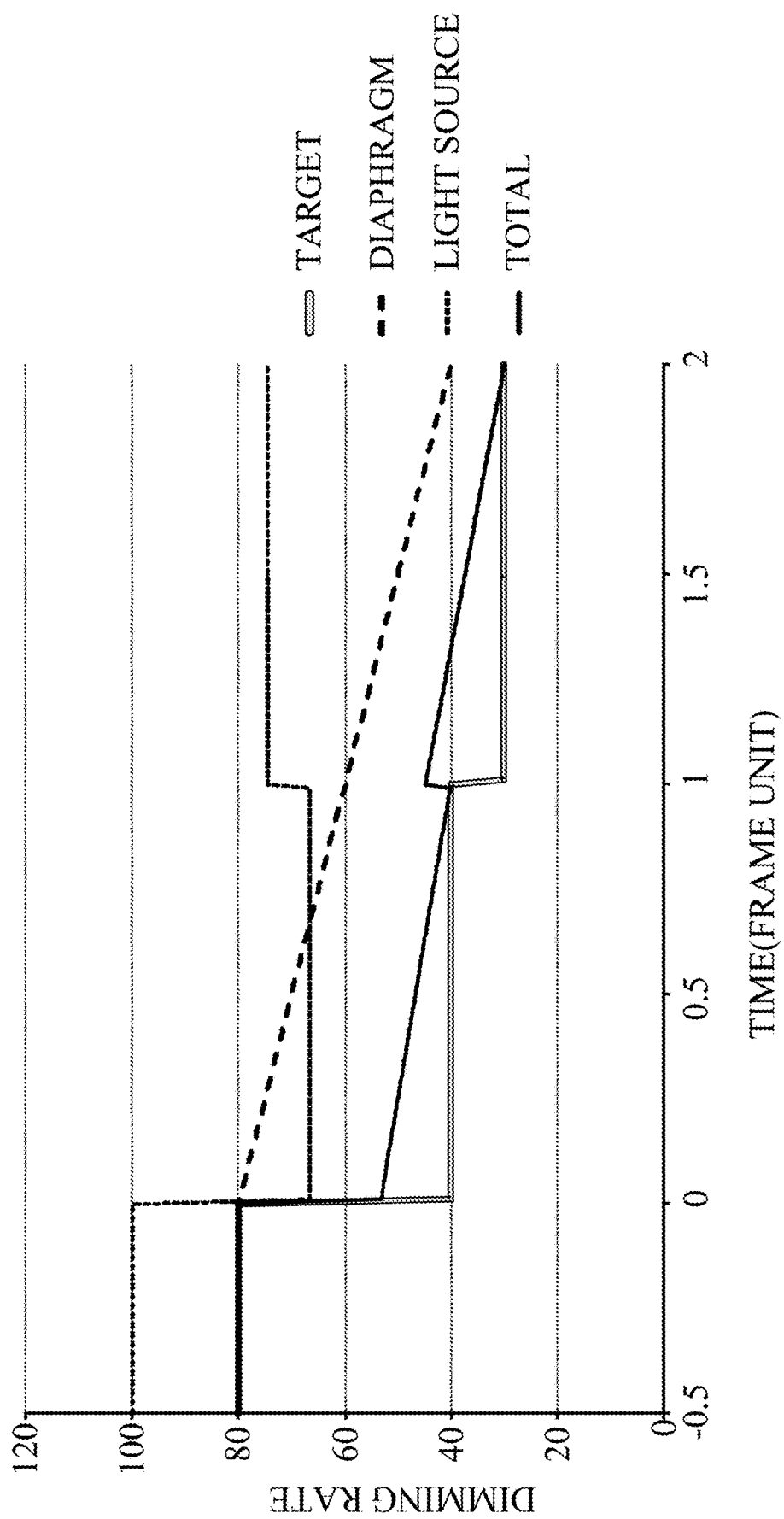
FIG. 4 is a graph showing temporal changes of the dimming rate by one frame of light source driving according to the second embodiment.
Figure 5:
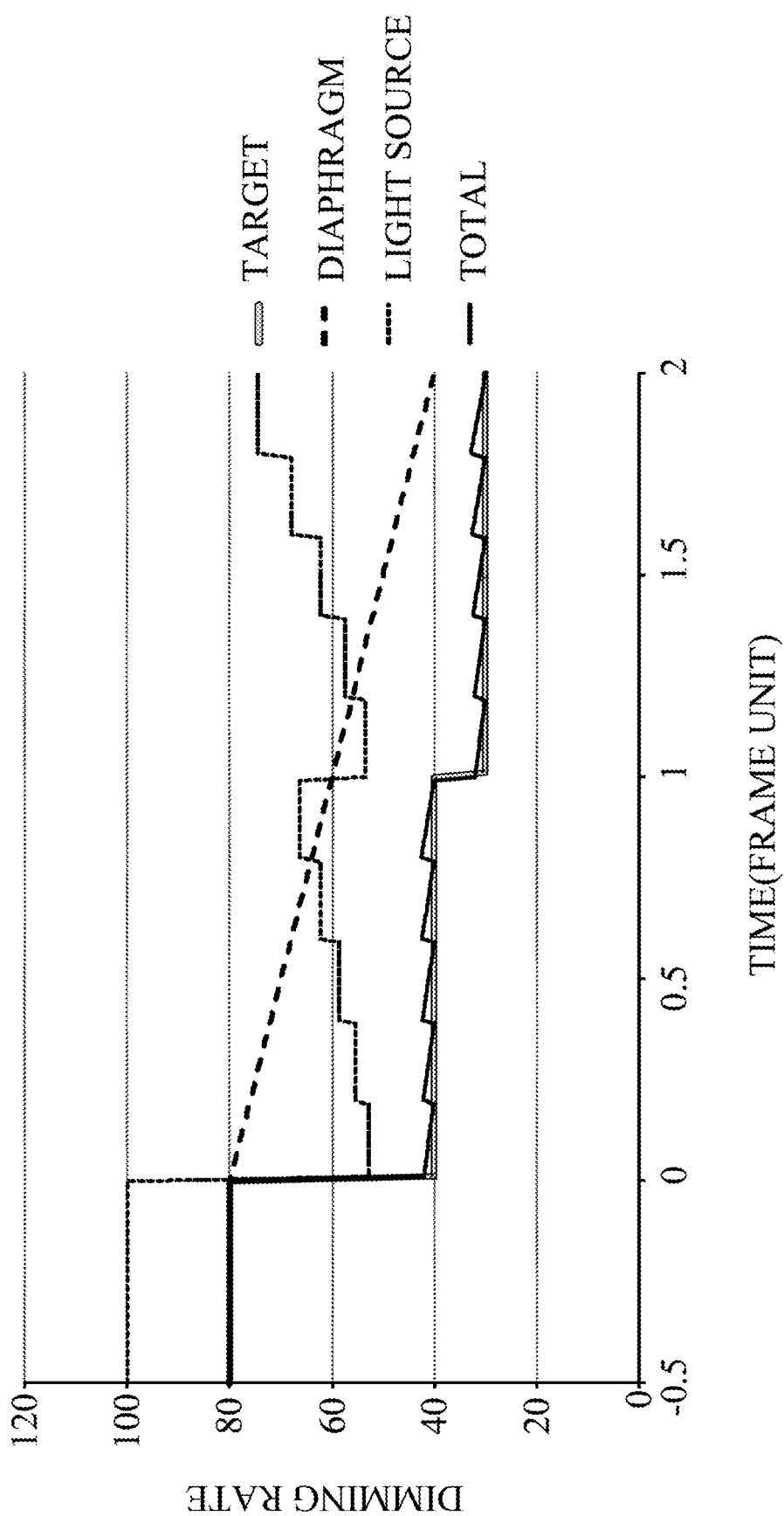
FIG. 5 is a graph showing temporal changes of the dimming rate by 0.2 frames of the light source driving according to the second embodiment.

In this embodiment, by performing the control in the above flow, a set interval of the light source 107 can be increased more frequently than that of the shutter diaphragm 109a. FIG. 4 illustrates temporal changes of the target dimming rate, the light source dimming rate, the diaphragm dimming rate, and an actual total dimming rate of the entire projector of the light source dimming rate and the diaphragm dimming rate when setting the set interval of the light the shutter diaphragm 109a and the set interval of the light source 107 by one frame. FIG. 5 illustrates temporal changes of the target dimming rate, the light source dimming rate, the diaphragm dimming rate, and an actual total dimming rate of the entire projector of the light source dimming rate and the diaphragm dimming rate when setting the set interval of the light the shutter diaphragm 109a by one frame and the set interval of the light source 107 by 0.2 frames.

The actual total dimming rate (total line) of the entire projector of the light source dimming rate and the diaphragm dimming rate is preferably close to the target dimming rate (target line), but the total line of FIG. 5 when the setting of the light source is performed frequently is closer to the target line compared with the total line of FIG. 4.

As described above, according to this embodiment, the actual dimming rate of the entire projector can be made closer to the target dimming rate during driving the shutter, and thereby can further improve the contrast effect.

Third Embodiment

Figure 6:
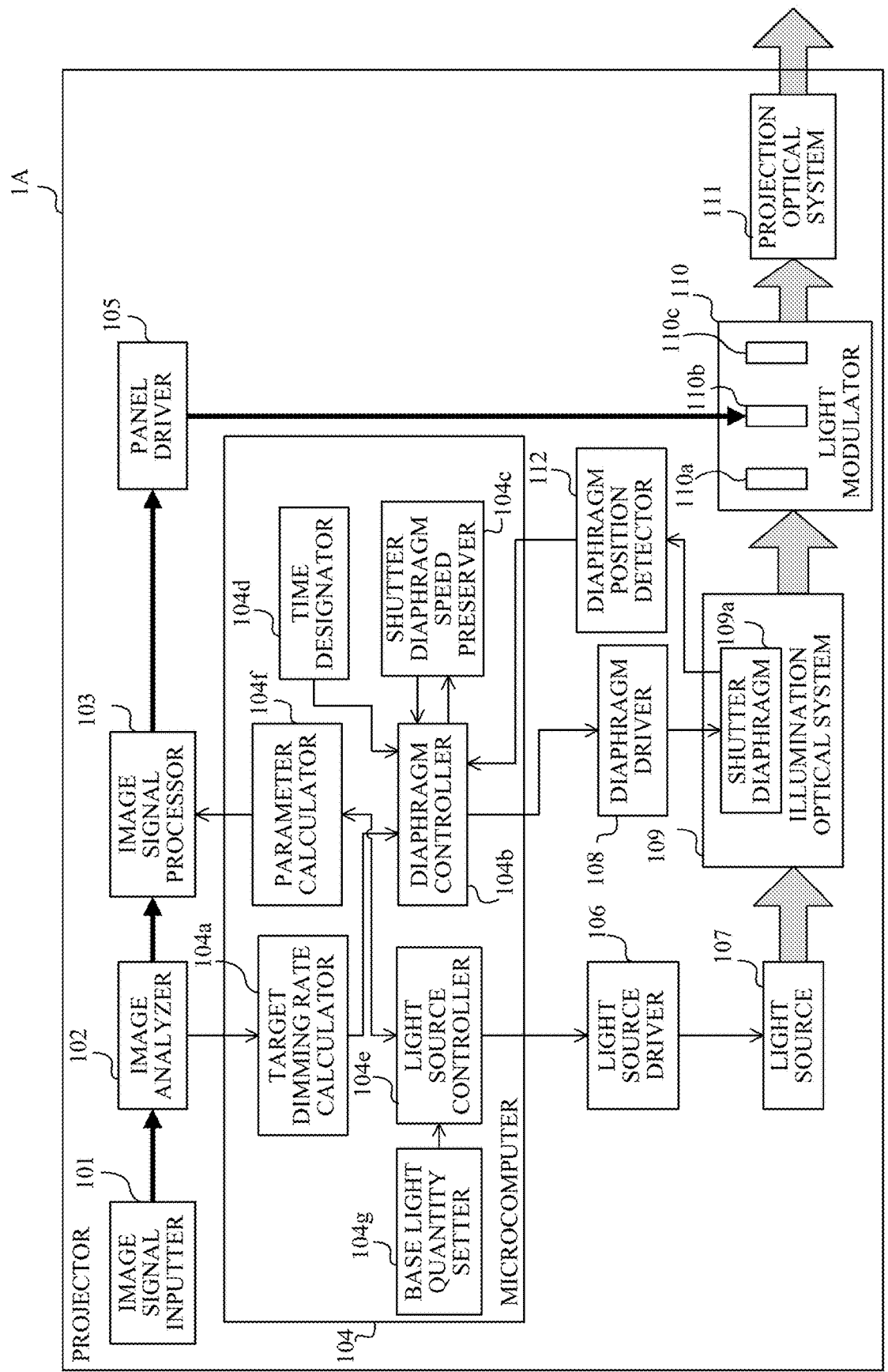
FIG. 6 is a block diagram of a projection display apparatus according to a third embodiment.

First, referring to FIG. 6, a description will be given of a projection display apparatus according to this embodiment. FIG. 6 is a block diagram of a projector 1A which is the projection display apparatus according to this embodiment. In this embodiment, components common to the projector 1 according to the first embodiment are denoted by the same reference numerals as those of the first embodiment, and thus a detailed description thereof will be omitted.

Figure 7:
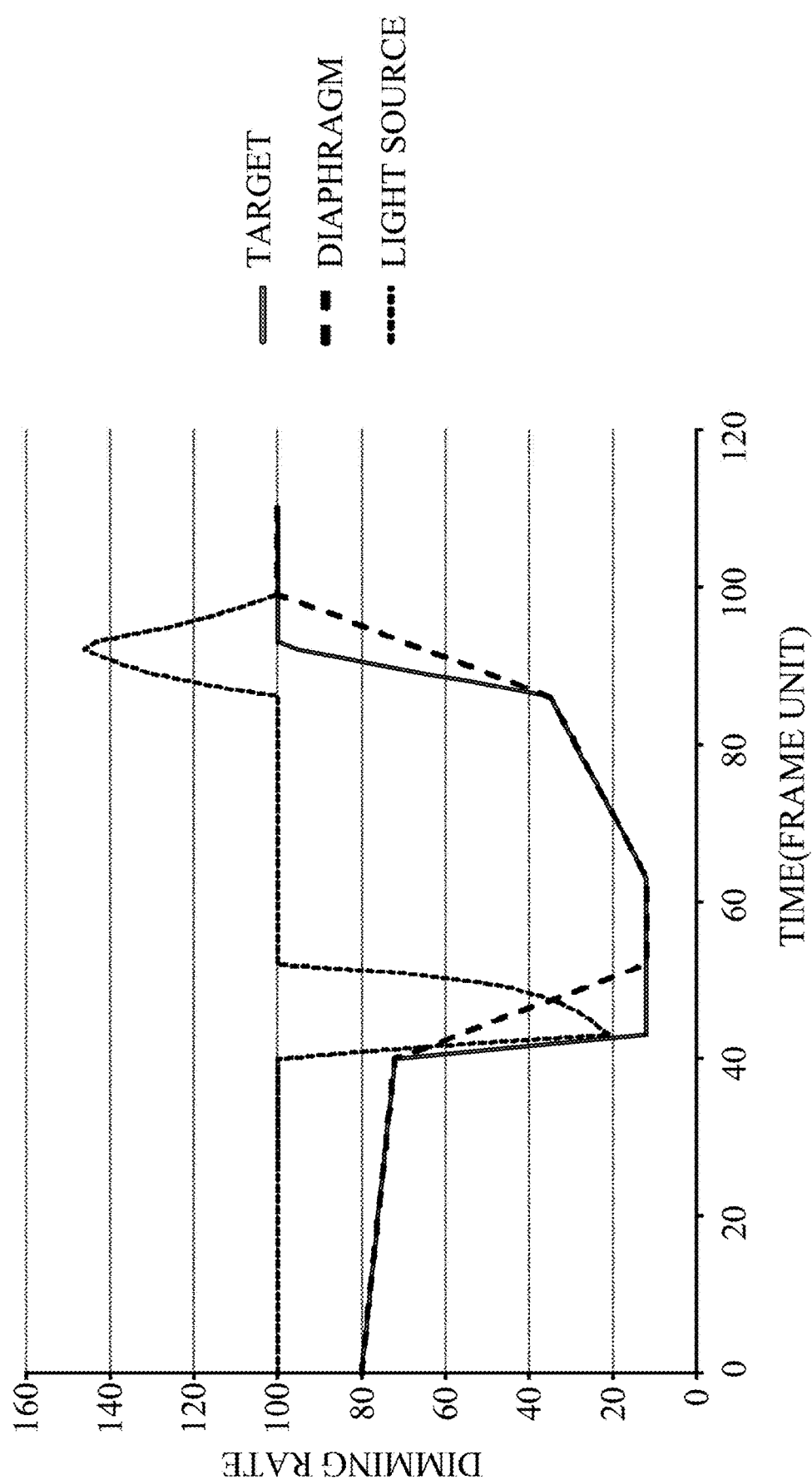
FIG. 7 is a graph showing temporal changes of a dimming rate according to the third embodiment.

A base light quantity setter (reference light quantity setter) 104g sets a base value (reference light quantity) of the light quantity of the light source 107 when not performing complementation of the shutter diaphragm operation to the light source controller 104e. FIG. 7 illustrates temporal changes of the target dimming rate, the light source dimming rate and the stop dimming rate when the diaphragm can change the dimming rate up to 5% in one frame. Between 40 frames and 60 frames, the target dimming rate decreases, but since the diaphragm dimming rate does not follow, the light source 107 is driven to compensate by the light source dimming rate. Further, between 80 frames and 100 frames, the target dimming rate increases, but since the diaphragm dimming rate does not follow, the light source 107 is driven to compensate by the light source dimming rate.

As illustrated in FIG. 7, complementation of a reduction of the target dimming rate can be dealt with by setting the light source dimming rate between 0% to 100%, but as for complementation of an increase of the target dimming rate, a setting value of the light source dimming rate exceeds 100%. In a light source such as a solid light source, if a temperature rise in a short time of driving is smaller than a prescribed value, correspondence to increase a light quantity may be performed, but is discouraged. In this case, when the target dimming rate increases, that is, a dark scene changes to a bright scene, complementation using the light source 107 may be performed.

By setting the base light quantity to, for example, 50%, the base light quantity setter 104g can halve the light source dimming rate of FIG. 7, and can set the light source dimming rate between 80 frames and 100 frames to be 100% or less. However, since the total light quantity decreases, the setting value of the base light quantity may be switched through modes depending on priority of a contrast or brightness. The optimum value of the base light quantity changes according to the operable speed of the shutter diaphragm 109a and the degree of the changes of the target light quantity.

According to this embodiment, the actual dimming rate of the entire projector can be made closer to the target dimming rate while driving of the shutter when the dark scene changes to the bright scene, and thereby can further improve the contrast effect.

Forth Embodiment

A configuration of a projector which is a projection display apparatus according to this embodiment is the same as that of the projector 1 according to the first embodiment and thus a detailed description thereof will be omitted.

In this embodiment, when driving the light source 107 by the difference between the target dimming rate and the diaphragm dimming rate to control the light source dimming rate, the maximum change quantity (predetermined change quantity) of the light source dimming rate (light quantity) in a predetermined period is set. In addition, the driving of the display panel is a line sequential type panel driving in which the display is updated in order from the top of the display panel.

Figure 8:
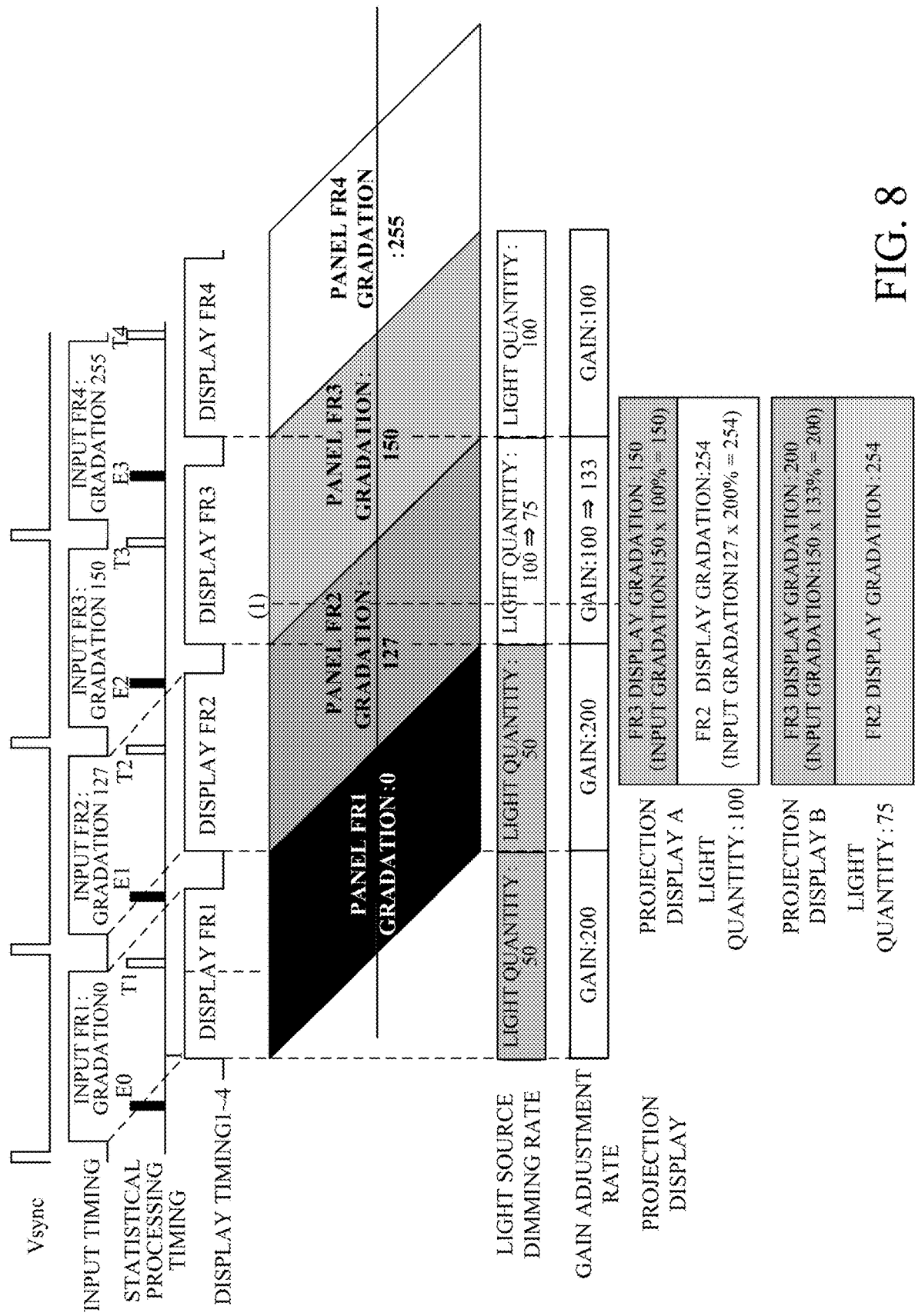
FIG. 8 illustrates a display state with respect to input data according to a fourth embodiment.

Referring to FIG. 8, a description will be given of the brightness of the projection image when controlling the difference between the target dimming rate and the diaphragm dimming rate by the light source dimming rate. Here, as with the first embodiment, the target light quantity calculator 104a calculates the target dimming rate, which is the target value of the light quantity adjustment of the entire projector 1, based on the analysis information (feature quantity) obtained from the image analyzer 102. The light source controller 104e calculates the light source dimming rate to reach to the target dimming rate based on the target dimming rate calculated by the target dimming rate calculator 104a and the diaphragm dimming rate obtained from the diaphragm controller 104b. The parameter calculator 104f calculates the gain adjustment rate to expand the image from the target dimming rate calculated by the target dimming rate calculator 104a. In this embodiment, to simplify the explanation, a description will be given of calculation of the light source dimming rate and the gain to reach to the target dimming rate by the difference between the target dimming rate and the diaphragm dimming rate.

As illustrated in FIG. 8, the image signal inputter 101 inputs the image in which input data is FR1 and all of input gradation data is 0 (all of input gradation date of previous frames before the input date FR1 is 0). In this case, the light source controller 104*e* sets the light source dimming rate to, for example, 50% to decrease brightness of a dark portion. The parameter calculator 104*f* calculates the gain adjustment rate to brighten the display relative to the input gradation by the decreased light quantity so that a gain of 200% is applied to the image data (the value of the input gradation data doubles). That is, when the input graduation data is 0, the brightness of the display becomes ½ and when the input graduation data is 1 or more, the brightness of the display becomes brightness before decreasing the light quantity by applying the gain of 200%. Here, all of the input gradation data in the frame is 0, but, for example, when there is input gradation data whose almost values are 0 and some values are 1 or more, the contrast can be improved by displaying the input gradation data of 0 (black) with the brightness of ½ while maintain the brightness in the case where the input gradation data is 1 or more.

Next, the image having the input gradation data of 127 (gradation data of 127 with 8-bit resolution) is input with the input data FR2. As with the previous described input data FR1, the light source dimming rate and the gain adjustment rate of the input data FR2 are calculated. In this case, since the maximum gradation data of the input data FR2 is 127, the light source dimming rate and the gain adjustment rate are respectively set to 50% and 200% (two times) to display the input data. Then, the light quantity and the display gradation data are respectively 50% and 254, and the image can be displayed with the brightness corresponding to the input gradation data of 127.

Next, the image having the input gradation data of 150 is input with the input data FR3. As with the previous described input data FR1, the light source dimming rate and the gain adjustment rate of the input data FR3 are calculated. In this case, since the maximum gradation data of the input data FR3 is 150, the light source dimming rate and the gain adjustment rate are respectively set to 100% and 100% (one time) to display the input data.

Here, the analysis information (feature quantity) at the time of displaying the input data FR3 (panel FR3 in FIG. 8) is obtained at a timing T2 when the input of the input data FR2 is completed. Further, since the operation time to calculate the light source dimming rate and the gain adjustment rate from the analysis information, the calculation result of the light source dimming rate and the gain adjustment rate is output at the timing E2 relative to the statistical processing timing T2. Accordingly, while updating the display of the input data FR3 line-sequentially, the light source dimming rate and the gain adjustment rate are switched on the basis of the analysis information (feature quantity). That is, as illustrated in FIG. 8, the projection display at the timing of (1) becomes the projection display, as illustrated as the projection display A, including the first half display (display corresponding to the input data FR3) which is updated with the gain adjustment rate of 100% and the second half display (display corresponding to the input data FR2) which is not updated.

Then, when the light source dimming rate of the light source 107 is set to 100%, the light quantity by the light source 107 changes entirely at the same time, and thus the variations of the brightness of a part corresponding to the second half display increases and the image is displayed brightly.

In this embodiment, the maximum change quantity of the light source dimming rate in the predetermined period is set, and the light quantity change by the light source 107 is controlled to be equal to or less than the maximum change quantity in the predetermined period. In this embodiment, a description will be given of the case where the maximum change quantity (predetermined change quantity) of the light source dimming rate in one frame period (predetermined period) is set to 25%. When displaying the input data FR3 as described above, the light source dimming rate and the gain adjustment rate of the input data FR3 are respectively calculated as 100% and 100% (one time). After calculating, the set light source dimming rate and the calculated light source dimming rate are compared. In this embodiment, since the set light source dimming rate and the calculated light source dimming rate are respectively 50% and 100%, the change quantity of the light source dimming rate becomes 50% and is larger than the maximum change quantity of 25%. Thus, the light source dimming rate when displaying the input data FR3 is corrected to 75% so that the maximum change quantity of the light quantity becomes 25% or less, and the gain adjustment rate is also corrected to 133% to correspond to the corrected light source dimming rate.

By correcting the light source dimming rate and the gain adjustment rate, the projection display, as illustrated as the projection display B, includes the first half display (display corresponding to the input data FR3) which is updated with the gain of 133% and the second half display (display corresponding to the input data FR2) which is not updated, but the variations of the brightness of the image can be suppressed. That is, when the difference between the target dimming rate and the diaphragm dimming rate is corrected by the light source dimming rate, the variations of the brightness of the image can be suppressed.

Figure 9:
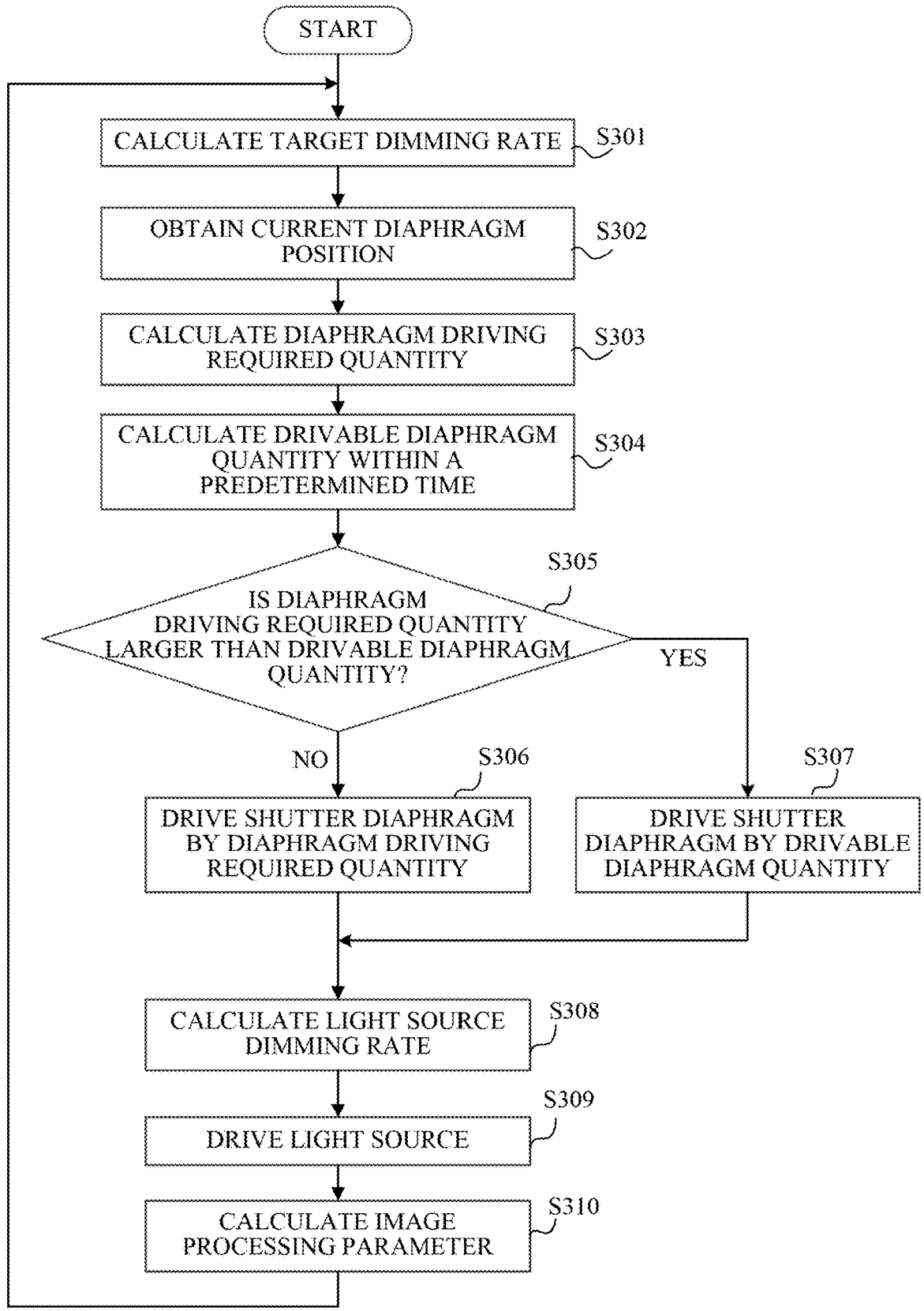
FIG. 9 is a flowchart of a control method to change a dimming rate according to the fourth embodiment.

Referring now to FIG. 9, a description will be given of a control method to change the dimming rate by the control unit 104 according to this embodiment. FIG. 9 is a flowchart of the control method to change the dimming rate.

The processes from the steps S301 to S307 are similar to the processes from the steps S101 to S107 of FIG. 2 and thus a detailed description thereof will be omitted.

In the step S308, the light source controller 104*e* calculates the light source dimming rate based on the target dimming rate, and the diaphragm dimming rate calculated from the diaphragm quantity set by the diaphragm controller 104*b* when driving the shutter diaphragm 109*a*. Specifically, the light source controller 104*e* calculates the difference between the target dimming rate and the diaphragm dimming rate as the light source dimming rate. When the difference between the target dimming rate and the diaphragm dimming rate is zero, that is, the diaphragm dimming rate reaches to the target dimming rate, controlling the light source dimming rate is unnecessary.

Here, the difference between the calculated light source dimming rate and the currently set light source dimming rate is calculated, and the difference is compared with the maximum change quantity previously stored in the storage unit (not illustrated). As a result of the comparison, when the difference is less than the maximum change quantity, the calculated light source dimming rate is used as it is. On the other hand, when the difference is larger than the maximum change quantity, the result of adding the currently set light source dimming rate and the maximum change quantity is used as the light source dimming rate.

In the step S309, the light source controller 104e drives the light source 107 through the light source deriver 106 on the basis of the light quantity setting value corresponding to the light source dimming rate calculated in the step S308.

In the step S310, the parameter calculator 104f calculates the setting parameters for the image processing in the image signal processor 103 from the target dimming rate calculated in the step S301 or the light source dimming rate. The calculated the setting parameters for the image processing are transmitted to the image signal processor 103. After this processing is completed and the set interval time set by the time designator 104d has passed, the flow moves to the step S301 to loop the processing.

As described above, according to this embodiment, when the difference between the target dimming rate and the diaphragm dimming rate is corrected by the light source dimming rate, setting the maximum change quantity of the light source dimming rate in a predetermined period can suppress the variations of the brightness of the projection image, and thus the contrast effect can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the driving of the shutter diaphragm 109a may be determined using the diaphragm speed instead of the diaphragm quantity.

In addition, a time delay for processing occurs between the time when the image signal is input to the image signal inputter 101 and the time when light modulation is performed by driving the liquid crystal panel 110b. Thus, the control unit 104 may include a delay time obtainer that obtains an image delay time (image processing time) for the projection state. Adjusting the shutter diaphragm 109a and the light source 107 in accordance with the image delay time obtained by the delay time obtainer can perform real-time dimming in accordance with changes in the projection image.

This application claims the benefit of Japanese Patent Applications No. 2017-169115, filed on Sep. 4, 2017, which is hereby incorporated by reference herein in its entirety.

What is claimed is:

1. A control apparatus comprising:
    a calculator that calculates a target dimming rate of a projection display apparatus based on a feature quantity of image data;
    a diaphragm controller that controls a diaphragm position of a diaphragm based on a target diaphragm position corresponding to the target dimming rate; and
    a light source controller that controls a light quantity of a light source based on the target dimming rate and a dimming rate of the diaphragm so that a change quantity of the light quantity in a predetermined period is equal to or less than a predetermined change quantity, at least until the diaphragm position of the diaphragm matches the target diaphragm position.

2. The control apparatus according to claim 1, wherein the diaphragm controller obtains the dimming rate of the diaphragm using a diaphragm quantity based on a difference between the target diaphragm position and a current position of the diaphragm, or a driving speed of the diaphragm and a set interval time of the diaphragm.

3. The control apparatus according to claim 1, wherein the diaphragm controller obtains the dimming rate of the diaphragm using a set interval time of the light source, a driving speed of the diaphragm, and a diaphragm quantity set as a driving quantity of the diaphragm by the diaphragm controller.

4. The control apparatus according to claim 1, further comprising a reference light quantity setter that sets a reference light quantity of the light source to be less than 100 percent.

5. The control apparatus according to claim 1, further comprising a gain calculator that calculates a gain, which is used when gain processing to the image data is performed, based on the target dimming rate.

6. The control apparatus according to claim 1, further comprising a color processing parameter calculator that calculates a color processing parameter, which is used when color changing processing to the image data is performed, based on the target dimming rate.

7. The control apparatus according to claim 1, further comprising a delay time obtainer that obtains an image delay time with respect to a projection state,
    wherein the diaphragm controller and the light source controller respectively control the diaphragm position of the diaphragm and a light quantity of the light source in accordance with the image delay time.

8. A projection display apparatus comprising a control apparatus,
    wherein the control apparatus includes:
        a calculator that calculates a target dimming rate of a projection display apparatus based on a feature quantity of image data;
        a diaphragm controller that controls a diaphragm position of a diaphragm based on a target diaphragm position corresponding to the target dimming rate; and
        a light source controller that controls a light quantity of a light source based on the target dimming rate and a dimming rate of the diaphragm so that a change quantity of the light quantity in a predetermined period is equal to or less than a predetermined change quantity, until the diaphragm position of the diaphragm matches the target diaphragm position.

9. A non-transitory computer-readable storage medium configured to store a computer program that enables a computer to be functioned as each unit of a control apparatus, wherein the control apparatus includes:
- a calculator that calculates a target dimming rate of a projection display apparatus based on a feature quantity of image data;
- a diaphragm controller that controls a diaphragm position of a diaphragm based on a target diaphragm position corresponding to the target dimming rate; and
- a light source controller that controls a light quantity of a light source based on the target dimming rate and a dimming rate of the diaphragm so that a change quantity of the light quantity in a predetermined period is equal to or less than a predetermined change quantity, until the diaphragm position of the diaphragm matches the target diaphragm position.

* * * * *